Feb. 11, 1936.  E. DONNINI  2,030,572
APPARATUS FOR THE MANUFACTURE OF LAMINATED GLASS
Filed May 6, 1933  2 Sheets-Sheet 1
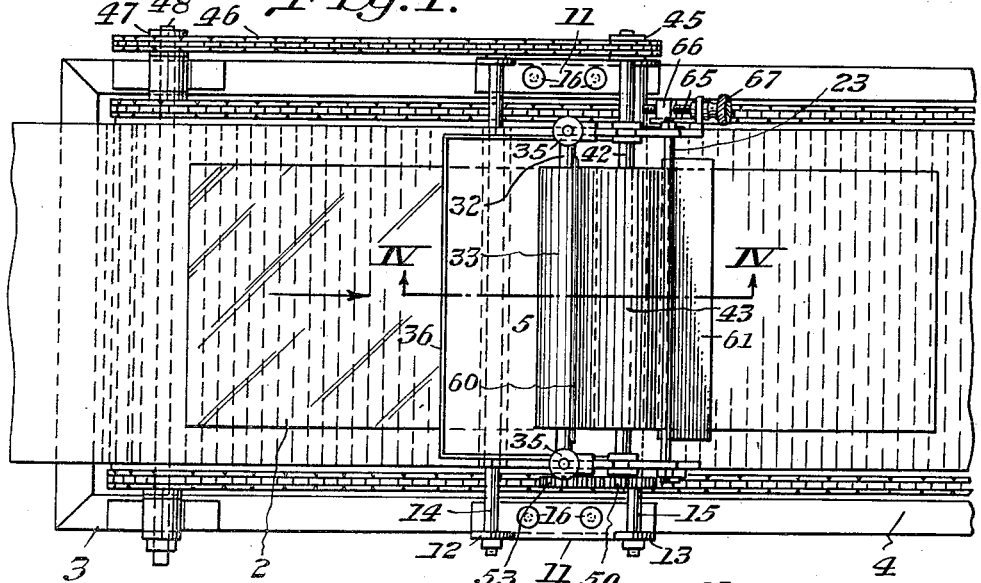
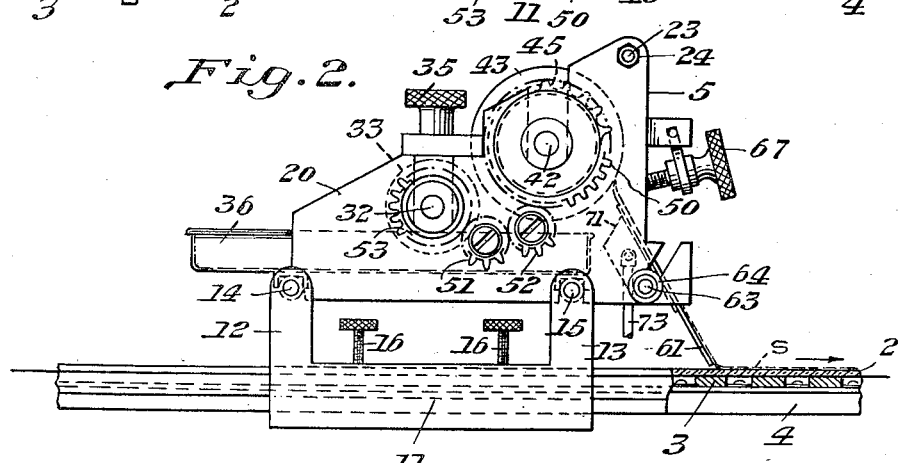
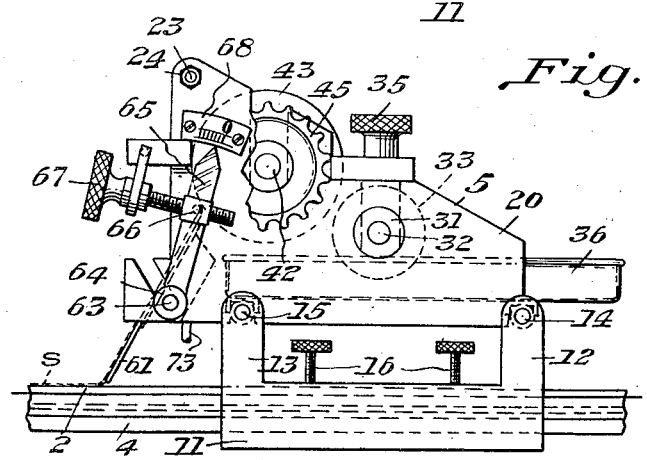
INVENTOR
Edlo Donnini
By Byrnes, Stebbins,
Parmelee & Blenko
Attorneys Feb. 11, 1936.   E. DONNINI   2,030,572
APPARATUS FOR THE MANUFACTURE OF LAMINATED GLASS
Filed May 6, 1933   2 Sheets-Sheet 2
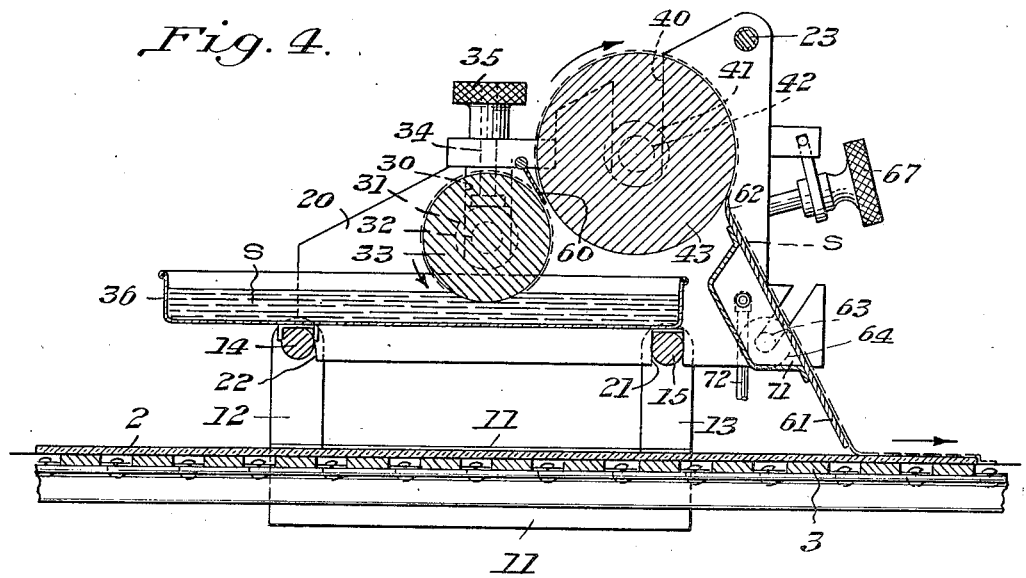
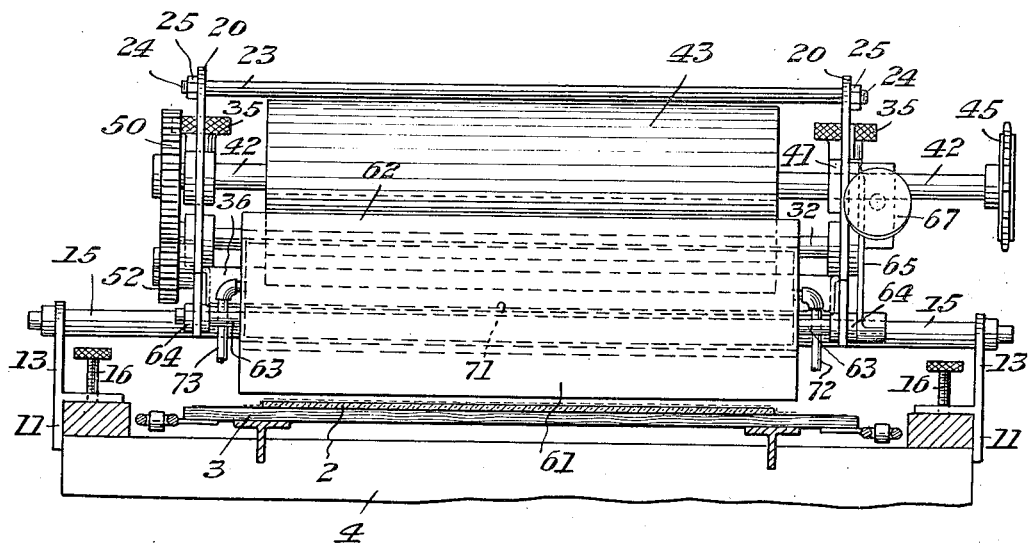
INVENTOR Patented Feb. 11, 1936

2,030,572

UNITED STATES PATENT OFFICE 2,030,572

APPARATUS FOR THE MANUFACTURE OF LAMINATED GLASS

Edlo Donnini, Jeannette, Pa., assignor to American Window Glass Company, Pittsburgh, Pa., a corporation of Pennsylvania Application May 6, 1933, Serial No. 669,737

4 Claims. (Cl. 91—43)

This invention relates to the manufacture of laminated glass and, more particularly, to improved apparatus for use in said manufacture.

Heretofore, laminated or strengthened glass has been manufactured by numerous processes and by the use of various materials as the strengthening medium to be interposed between the glass sheets and rigidly united thereto. Cellulose composition materials, such as cellulose nitrate and cellulose acetate, have been used extensively as the strengthening medium, and have been united to the glass sheets by various materials and by various processes. In practically all instances where a successful product has been made, a sheet of the strengthening material has been interposed between the glass sheets and rigidly united thereto.

In the copending application of Frederic L. Bishop and Charles S. Shoemaker, Serial No. 658,598, filed February 25, 1933, there is shown and described a process for manufacturing laminated glass wherein a solution of a strengthening material is flowed on at least one of the two glass sheets to be formed into the sandwich, the strengthening layer dried and the sandwich formed.

The present invention relates to apparatus for uniformly flowing the solution of strengthening material on the glass sheets, and provides a highly desirable and satisfactory apparatus for accomplishing this purpose.

It has been found highly desirable, where a liquid strengthening material is flowed uniformly over the glass sheets in the manufacture of laminated glass, to control the temperature of the solution as it is flowed on the sheets. Accordingly, by my invention I also provide means for heating or cooling the solution as it flows on the sheets.

In the drawings I have shown for purposes of illustration only, a preferred embodiment of my invention. It will be understood, however, that I do not intend to be limited to the specific structure illustrated in the drawings, but that my invention may be otherwise embodied within the scope of the appended claims.

In the drawings—

Figure 1 is a plan view of the apparatus which I provide;

Figure 2 is an end elevational view of the apparatus shown in Figure 1;

Figure 3 is an end elevational view of the apparatus shown in Figure 1, taken from the end opposite to that shown in Figure 2;

Figure 4 is a sectional view taken on the line IV—IV of Figure 1; and

Figure 5 is a front elevational view of the apparatus which I provide, the conveyor being shown in section.

In carrying out the manufacture of laminated glass using the apparatus which I provide, the glass sheets 2 to be coated and subsequently formed into the composite sheet of laminated glass, are first chemically or mechanically cleaned. They are then placed on a conveyor mechanism, indicated generally by the reference character 3, mounted on a frame 4. The conveyor mechanism carries each glass sheet 2 past the flow machine, indicated generally by the reference character 5, which I provide for flowing the liquid strengthening material uniformly on the glass sheets as they are carried thereby by the conveyor. The conveyor mechanism forms no part of my invention and, accordingly, will not be specifically described, for any sort of conveying mechanism may be used in combination with the machine which I provide.

The flow machine 5 is mounted on the frame 4 of the conveying mechanism. For this purpose, supporting standards 11 are provided on opposite sides of the conveyor frame. Each supporting standard 11 has upwardly projecting arms 12 and 13 adapted to receive and support cross bars 14 and 15 which in turn support the flow machine. Adjusting screws 16 are provided on each of the supporting standards 11 for the purpose of enabling the proper leveling and vertical adjustment of the flow machine relative to the glass sheet being carried thereby by means of the conveying mechanism.

The flow machine is provided with end plates 20, each of which has a recess 21 therein adapted to receive the transversely extending supporting rod 15. The rear end of each end plate is provided with a cut-away portion 22 adapted to fit over the transversely extending rod 14. The upper ends of the end plates 20 are joined together by means of a bolt 23 having a threaded portion 24 adjacent each end adapted to receive clamping nuts 25. Shoulders are provided adjacent the threaded ends 24 so that the nuts 25 will force the end plates 20 against the shoulders and form a rigid connection between the plates.

Each end plate 20 is provided with vertically extending openings 30 adapted to receive and support bearings 31 which are adapted to receive the cross shaft 32 of a roll 33. The roll 33 is preferably of metal, but may be made of any other suitable material which will not permit the liquid strengthening material S to be flowed on the glass sheets to adhere too strongly thereto. An adjusting screw 34 having a knurled head 35 thereon is provided for each bearing 31 so as to provide means for adjusting the roll 33 vertically for the purpose of controlling the quantity of the strengthening material S picked up by the roll 33 from the pan 36 which is mounted on the transversely extending supporting rods 14 and 15.

The end plates 20 are provided with additional vertically extending openings 40 adapted to receive bearings 41 for supporting the cross shaft 42 of a second roll 43. The roll 43 is positioned slightly above the roll 33 in order to facilitate the transfer of strengthening material from one roll to the other. The roll 43 may or may not be made adjustable relative to the roll 33. As shown in the drawings, it is fixed and cannot be raised or lowered relative to the roll 33.

The shaft 42 of the roll 43 is provided with a sprocket wheel 45 adapted to cooperate with a chain 46 which may be driven by any suitable means. As shown in the drawings, the chain 46 is driven by the sprocket wheel 47 carried by the cross shaft 48 of the conveyor mechanism. An arrangement of this character is desirable for the reason that if the speed of the conveyor mechanism is increased, the speed of operation of the flow machine will be correspondingly increased. The shaft 42 of the roll 43 carries a gear 50 adjacent one end thereof. The gear 50 carried by the roll shaft 42 cooperates with a similar gear 53 carried by the roll shaft 32 through speed-reducing gears 51 and 52. This arrangement permits both rolls 33 and 43 to be driven by the same source of power and insures that the peripheral speed of each roll will be identical.

The roll 33, as viewed in Figure 4, is rotated in a counter-clockwise direction, and, as the lower portion thereof is immersed in the liquid strengthening material S in the pan 36, a thin film of the strengthening material will adhere to the face of the roll and be carried upwardly thereby. A doctor member 60 is provided for removing the thin film of liquid strengthening material adhering to the roll 33 and transfer it to the roll 43, which, as shown in Figure 4, is rotated in a clockwise direction. The thin film of liquid strengthening material formed on the roll 33 and transferred to the roll 43 is of substantially uniform thickness due to the fact that liquid may flow to a certain extent over the faces of the rolls so as to become uniformly distributed thereover.

An inclined plate 61 having a curved upper end 62 is provided adjacent the face of the roll 43 and, as the roll 43 is rotated, the curved upper end 62 removes therefrom the thin film of liquid strengthening material carried by the roll. The material flows over the inclined plate 61 which is positioned to discharge the layer of liquid strengthening material on the glass sheets as they are carried past the lower edge thereof by the conveyor mechanism.

The inclined plate 61 is mounted on a cross shaft 63 which is mounted in bearings 64 carried by the end plates 20 of the machine. The shaft 63 also carries a pointer and adjusting lever 65 having a threaded section 66 adapted to cooperate with an adjusting screw 67 so as to permit adjustment of the angle of inclination of the inclined plate 61. A scale 68 is provided for cooperation with the pointer 65 for indicating the angle at which the plate 61 is inclined to the horizontal.

As can be readily seen, by my invention I provide a structure which may be used for the formation of a uniform thin film of liquid strengthening material and for flowing the formed film of strengthening material on a glass sheet. It will be readily understood that the flow machine which I provide may itself be moved and the glass sheets retained in a stationary position. It is only necessary that relative movement between the flow machine and the glass sheets be provided for.

As stated above, it is highly desirable to control the temperature of the solution of strengthening material as it is flowed on the glass sheets. By properly regulating the temperature of the solution at this time, the viscosity thereof may be controlled. Accordingly, the inclined plate 61 is provided with a heating or cooling chamber 71 communicating with an inlet pipe 72 and an outlet pipe 73 for supplying a heating or cooling fluid to the chamber for heating or cooling the inclined plate 61 which in turn heats or cools the film of liquid strengthening material as it passes over it. As can be readily seen, in this manner the temperature of the solution may be regulated as desired just as it is flowed on the glass sheets.

While I have shown and described a preferred embodiment of my invention, it will be understood that I do not intend to be limited by the particular constructional details shown and described, as my invention may be readily otherwise embodied within the scope of the appended claims.

I claim:

1. In apparatus for the manufacture of laminated glass, means for forming a film of a liquid, means including an inclined plate for flowing the film on a glass sheet, and means for regulating the temperature of said inclined plate for controlling the temperature of the liquid as it is flowed on the glass sheets.

2. In apparatus for the manufacture of laminated glass, means including an inclined plate for flowing a solution of a strengthening material on a glass sheet, and means for regulating the temperature of said inclined plate for controlling the temperature of the solution as it is flowed on said sheet.

3. Apparatus for the manufacture of laminated glass comprising a supporting frame, a liquid reservoir thereon, means including a roll cooperating with said reservoir for forming a film of the liquid in said reservoir on said roll, means for driving the roll, means for removing the film from the roll and for flowing it as a continuous film on a glass sheet including an inclined plate over which it is flowed, and means for controlling the temperature of the solution as it is flowed over said plate.

4. Apparatus for the manufacture of laminated glass comprising a supporting frame, a liquid reservoir, a roll carried by the frame and positioned for cooperation with the liquid reservoir for forming a film of the liquid on said roll, a second roll carried by the frame adjacent the first mentioned roll to which the film is transferred, means for removing the film from said second roll and for flowing it on a glass sheet including an inclined plate over which the film flows as a continuous film, and heating means for heating the film as it is flowed over said plate.

EDLO DONNINI.